United States Patent [19]

Osakabe

[11] Patent Number: 5,872,763
[45] Date of Patent: Feb. 16, 1999

[54] METHOD AND DEVICE FOR RECORDING ON OPTICAL DISC

[75] Inventor: Katsuichi Osakabe, Hamamatsu, Japan

[73] Assignee: Yamaha Corporation, Hamamatsu, Japan

[21] Appl. No.: 905,976

[22] Filed: Aug. 5, 1997

[30] Foreign Application Priority Data

Aug. 14, 1996 [JP] Japan ................................ 8-232489

[51] Int. Cl.$^6$ .............................. G11B 11/03; G11B 7/00
[52] U.S. Cl. .............................................. 369/116; 369/54
[58] Field of Search ............................... 369/116, 54

[56] References Cited

U.S. PATENT DOCUMENTS

| | | | |
|---|---|---|---|
| 5,305,297 | 4/1994 | Nishiuchi et al. | 369/116 |
| 5,732,061 | 3/1998 | Kirino et al. | 369/116 |
| 5,740,149 | 4/1998 | Iwasaki et al. | 369/116 |

*Primary Examiner*—Tod R. Swann
*Assistant Examiner*—Kim-Kwok Chu
*Attorney, Agent, or Firm*—Pillsbury Madison & Sutro

[57] ABSTRACT

Test-recording signals are recorded onto an optical disc by variously varying the intensity values of erasing power and bottom power as well as writing power of a laser light beam, in order to determine a combination of optimum intensity values of the writing power and erasing power, of the writing power and bottom power or of the writing power, erasing power and bottom power. Then, actual-recording signals are recorded in accordance with the thus-determined combination of optimum intensity values. With this arrangement, optimum recording conditions can be constantly provided irrespective of non-uniform and time-varying characteristics of various optical discs used, and it is possible to reliably prevent reproduction errors or failure of reproduction.

6 Claims, 9 Drawing Sheets

METHOD AND DEVICE FOR RECORDING ON OPTICAL DISC

BACKGROUND OF THE INVENTION

The present invention relates to a method and device for recording data on rewritable or write-once optical discs, which permit optimal recording with minimized possibility of reproduction failure and reproduction errors.

Phase-change optical discs are known today as an example of rewritable optical discs and generally classified into Type 1 and Type 2 discs in terms of their behaviors and recording speeds. The so-called "overwrite recording" on the Type 1 phase-change optical disc uses a single laser light beam which is varied among three different energy or power intensity values Pw, Pe and Pb, as shown at (a) in FIG. 2. The first value Pw represents intensity of "writing power" for transforming the recording layer of the disc from its original crystallized state to an amorphous state so as to form pits in the layer. The second value Pe represents intensity of "erasing power" for restoring the amorphous state of the recording layer to the original crystallized state so as to erase (overwrite) the formed pits. The third value Pb represents intensity for "bottom power (base power)" that correspond to bottom power of pulses in the so-called "divided-pulse recording" and acts to prevent heat diffusion resulting from the laser light beam irradiation during the recording. The pulse-dividing period is typically set to the length of 1 T in the conventional CD format, although it may be set to any other suitable time length. With such a laser light beam varied among the three power intensity values Pw, Pe and Pb, each pit is formed continuously over a length corresponding to a predetermined number of divided pulses, as shown at (b) in FIG. 2.

For the overwrite-recording on the Type 2 phase-change optical disc or recording on the write-once optical disc, a single laser light beam is used which is switched between two respective intensity values of the writing power Pw and the erasing power Pe (or bottom power Pb), as shown in FIG. 3.

The optimum writing power intensity value Pwo of the laser light beam differs among various types of optical disc, and hence the writing power intensity value Pwo is typically determined by tentatively writing or test recording input signals prior to actual recording of the signals. According to the CD-Write Once (CD-WO) standards, an area to be used for the test recording, commonly known as a PCA (Power Calibration Area), is reserved along the innermost edge of each optical disc, and the optimum writing power intensity value Pwo is set through a series of operations commonly known as "OPC" (Optimum Power Control).

In the conventionally-known OPC operations, the test recording is carried out by varying the writing power intensity value Pw step by step as shown in FIG. 4, and the test-recorded area is then reproduced, and an asymmetry value (index indicating asymmetry of HF signals) β is calculated, for each of the varied intensity values Pw, as a characteristic parameter representing the recording quality of the signals as shown in FIG. 5. Then, the writing power intensity value Pw resulting in an optimal asymmetry value (e.g., 0.04) is set as the optimum writing power intensity value Pwo to be used in the actual recording. Conventionally, the erasing power Pe and bottom bottom power Pb are set to fixed intensity values that were predetermined through experiments.

However, the conventionally-known techniques had the problem that the erasing power and bottom power of fixed intensity values would often result in reproduction failure or errors due to non-uniform and time-varying conditions of various discs used, different specifications of the disc makers, etc.

SUMMARY OF THE INVENTION

It is therefore an object of the present invention to provided a method and device for recording data on an optical disc which permit optimal recording with minimized possibility of reproduction failure and reproduction errors.

In order to accomplish the above-mentioned object, the present invention provides a method and device for recording on an optical disc, which are characterized in that test-recording signals are recorded onto the optical disc by variously changing the intensity values of the erasing power and bottom power as well as the writing power in order to determine a combination of optimum intensity values of the writing power and erasing power, of the writing power and bottom power or of the writing power, erasing power and bottom power, and that actual-recording signals are then recorded in accordance with the thus-determined combination of optimum intensity values. With this arrangement, optimum recording conditions can be constantly afforded, irrespective of non-uniform and time-varying characteristics of various discs used and the like, which reliably prevent reproduction failure and reproduction errors.

BRIEF DESCRIPTION OF THE DRAWINGS

Now, the present invention will be described in detail below with reference to the accompanying drawings, in which.

DETAILED DESCRIPTION OF THE PREFERRED EMBODIMENTS

A preferred embodiment of the present invention will now be described in relation to a particular case where data is recorded in the CD format on a Type 1 phase-change optical disc. As known in the art, with the Type 1 phase-change optical disc, data recording and erasure are effected by a single laser light beam that is set to different intensity values to function as writing power, erasing power and bottom power (i.e., by separately setting intensity values of the writing, erasing and bottom power Pw, Pe and Pb).

Figure 1:
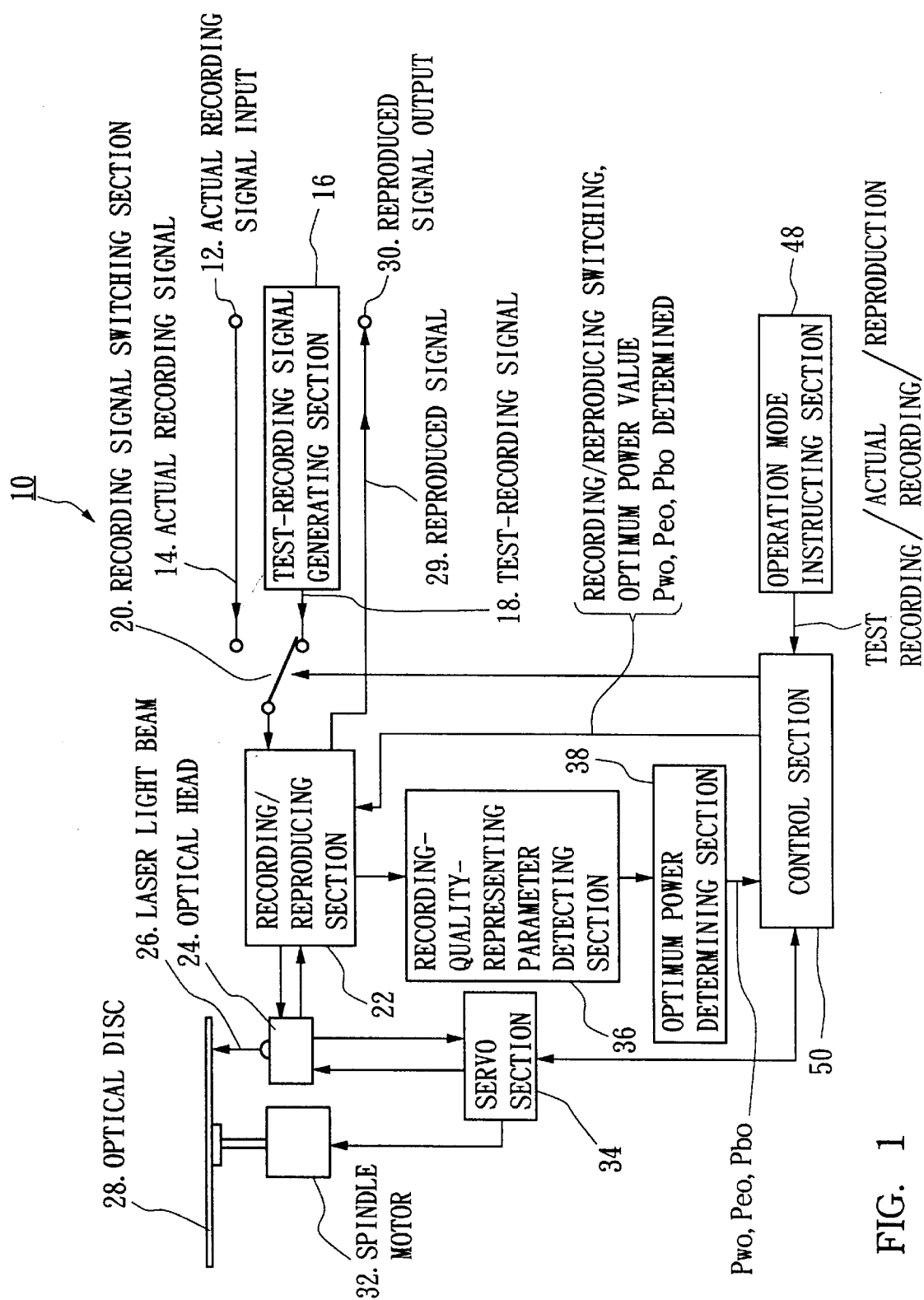
FIG. 1 is a block diagram showing principal sections of a device for recording data on a rewritable optical disc according to an embodiment of the present invention.

FIG. 1 is a block diagram showing principal sections of a device 10 for recording data on the rewritable optical disc according to the embodiment of the present invention. Signals 14, representing music data, ROM data or the like to be actually recorded (hereinafter called "actual-recording signals"), are introduced into the device 10 via an actual-recording signal input 12. Test-recording signal generating section 16 outputs test-recording signals 18 of a predetermined pattern. Recording signal switching section 20 selects either the actual-recording signals 14 or the test-recording signals 18 in response to a predetermined instruction.

Optical disc 28 is a Type 1 phase-change optical disc, which is driven to rotate by means of a spindle motor 32. Optical head 24 emits a laser light beam 26 for recording and reproducing data to and from the optical disc 28. More specifically, the laser light beam 26 in the actual or test recording mode is emitted as a recording laser light beam for simultaneously effecting writing of new signals and erasure of older (already written) signals, while the laser light beam 26 in the reproduction mode is emitted as a lower-power reproducing laser light beam. The power intensity of the laser light beam 26 is controlled, via an ALPC (Automatic Laser Power Control) circuit, to take an instructed value with high accuracy.

Recording and reproducing section 22, in the recording mode, modulates the laser light beam 26 from emitted the optical head 24 with the recording signals, while the recording and reproducing section 22, in the reproducing mode, uses the reproducing laser light beam 26 from the optical head 26 to reproductively read out the recorded signals from the optical disc 28. Each of the thus-reproduced signals 29 is supplied outside the device 10 via a reproduced signal output 30. On the basis of output signals from the optical head 24, a servo control section 34 executes a spindle servo, tracking servo, focus servo, feed servo, etc. to accurately position the optical head 24 relative to the optical disc.

Recording-quality-representing parameter detecting section 36 detects, as a characteristic parameter from which to determine the recording quality of the recorded signals on the optical disc, a modulation factor or error rate (the number or proportion of reproduction errors) indexing asymmetry values or HF amplitude values of the test-recording signals reproduced by the recording and reproducing section 22. On the basis of a result of the detection by the recording-quality-representing parameter detecting section 36, an optimum power determining section 38 determines a combination of optimum intensity values of the writing and erasing power, of the writing and bottom power or of the writing, erasing and bottom power that results in a practically best value of the characteristic parameter.

Figure 6:
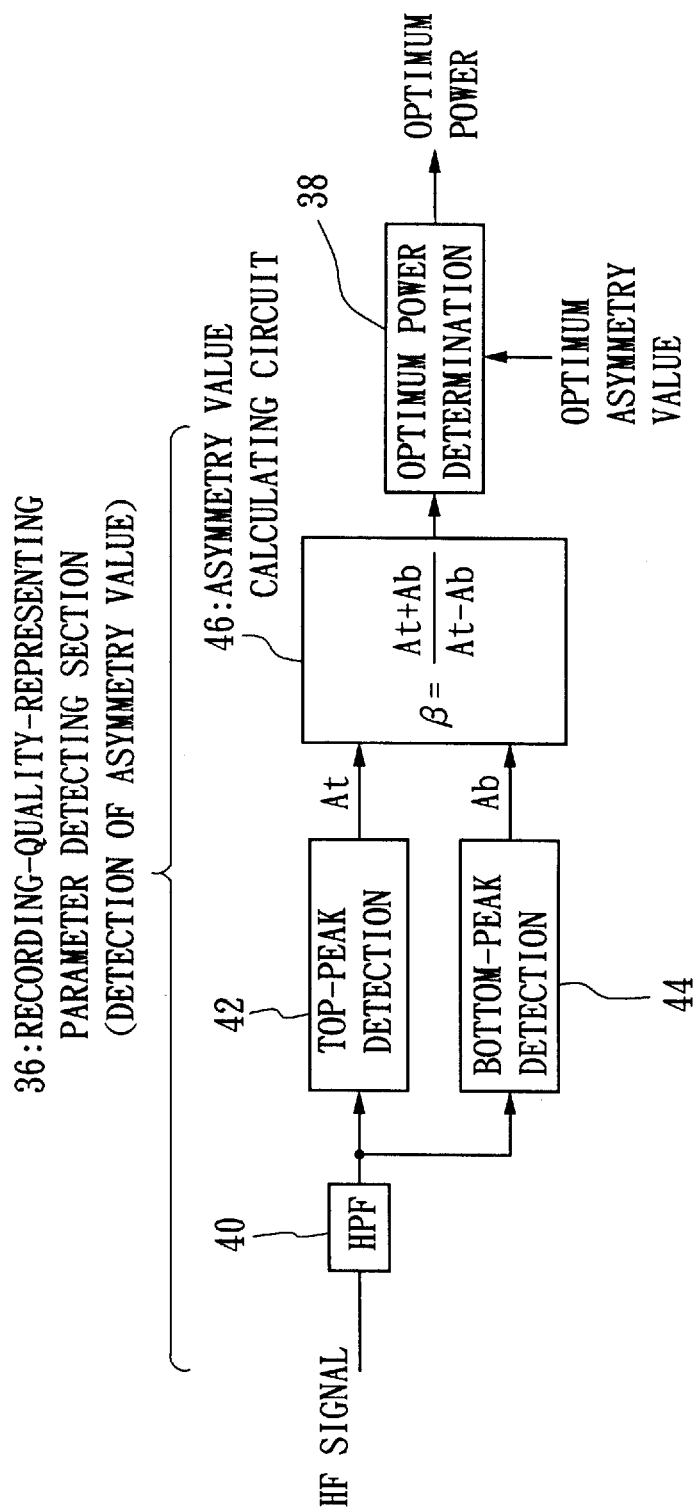
FIG. 6 is a functional block diagram showing detailed operations for detecting asymmetry values and determining optimum intensity values.
Figure 7:
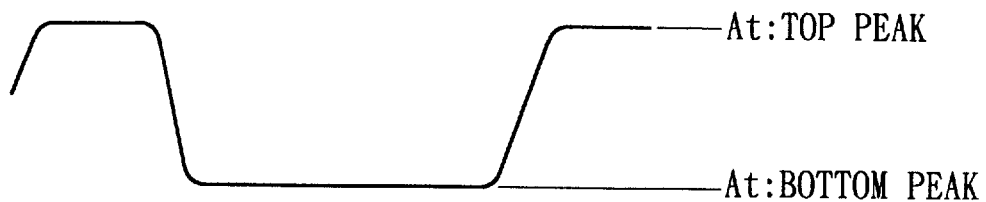
FIG. 7 is a waveform diagram showing signals reproduced from the optical disc.

FIG. 6 is a block diagram showing a detailed example of circuitry for determining the recording quality from the asymmetry values to thereby determine the optimum power intensity values. HF (High Frequency) signals are given to a high-pass filter 40, which removes the direct current components therefrom to provide signals as shown in FIG. 7. For each of the laser light beam power intensity values switched in the recording mode (i.e., the writing, erasing and bottom power intensity values), a top-peak detecting circuit 42 and bottom-peak detecting circuit 44 detect a top (positive or plus) peak and bottom (negative or minus) peak, respectively, of each HF signal through analog operations. Asymmetry value calculating circuit 46 calculates asymmetry values $\beta$ for each of the laser power intensity values by evaluating an expression of $(At+Ab)\div(At-Ab)$. Then, on the basis of the calculated asymmetry values $\beta$, the optimum power determining section 38 selects one of the combinations of the laser power intensity values which affords an asymmetry value closest to an optimum asymmetry value (e.g., 0.04).

The following paragraphs describe an example of a scheme in which the recording quality is determined from the modulation factor. The recording standards for phase-change discs (CD-E) prescribe the following modulation factor m as an index indicating a HF amplitude of a reproduced HF signal:

$$m = I11/Itop$$

, where I11 represents an HF amplitude provided by 11T pits and lands (i.e., flats each located between two adjacent pits), and Itop represents light reflectance in the land (i.e., reflectance in a portion with no pit).

Figure 8:
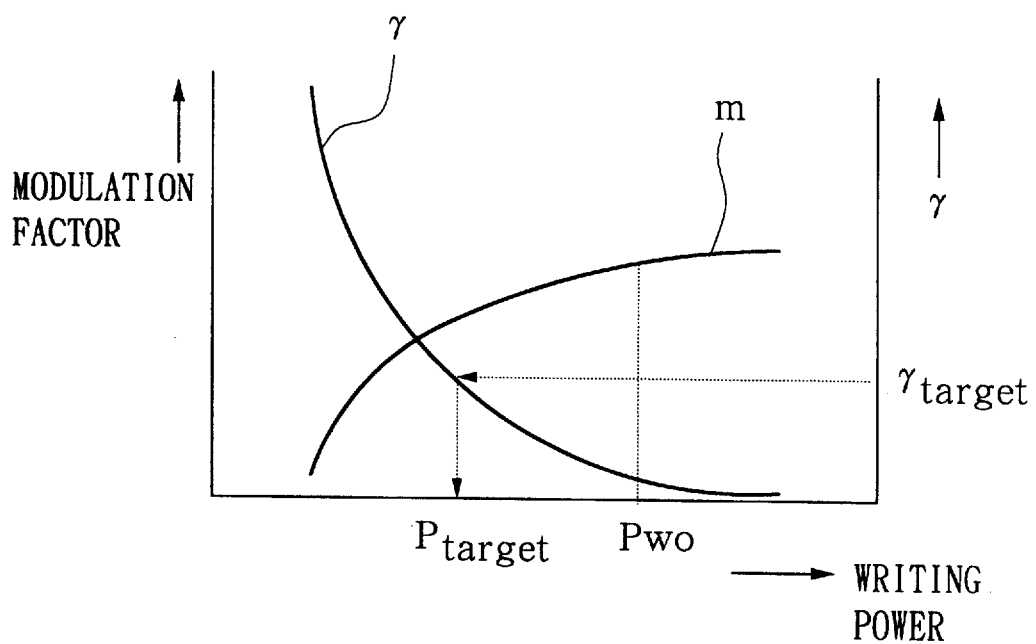
FIG. 8 is a graph showing characteristic curves of modulation factor m and parameter γ obtained by differentiating the modulation factor m.

The modulation factor m varies with varied intensity of the writing power Pw, as plotted in FIG. 8. As shown, when the writing power Pw is of low intensity, the modulation factor m is small due to a small amplitude of the reproduced HF signal. As the intensity of the writing power Pw gets higher, the modulation factor m becomes greater due to a greater amplitude of the reproduced HF signal. Once the intensity of the writing power Pw reaches a predetermined level, the modulation factor m reaches its upper limit or saturation level. The HF signal recorded with the writing power Pw just below the saturation level was found to present least jitters and errors, and hence such writing power intensity Pw just below the saturation level can be determined as an optimum writing power intensity value Pwo.

As another example of the scheme in which the recording quality is determined from the modulation factor, there may be used the following parameter $\gamma$ that is determined from a characteristic of the modulation factor m:

$$\gamma = (dm/dPw) \times (Pw/m)$$

Namely, parameter $\gamma$ is determined by differentiating the characteristic of the modulation factor m. On the optical disc, a target value $\gamma$ target of parameter $\gamma$ is prerecorded as ATIP information. So, a characteristic of parameter $\gamma$ is determined from the characteristic of the modulation factor m using the above equation (see FIG. 8), and a writing power intensity value Ptarget is determined which yields the target value $\gamma$ target. On the optical disc, there is further prerecorded coefficient $\rho$ for determining an optimum writing power intensity value Pwo from the target value from Ptarget; thus an optimum writing power intensity value Pwo can be determined from this coefficient $\rho$ using the following equation:

$$Pwo = \rho \times Ptarget$$

Referring back to Fig. 1, an operation mode instructing section 48 automatically issues an instruction to switch the operation mode of the recording device 10 to any one of the test recording mode, actual recording mode and reproducing mode (i.e., a mode for reproducing actual-recording signals), in response to mode designating operation or disc loading operation by a human operator.

In response to the instruction from the operation mode instructing section 48, a control section 50 controls the recording device 10 to execute the instructed operation. That is, when the test recording mode is instructed, the control section 50 controls the recording signal switching section 20 to connect to the test-recording signal generating section 16 so that test-recording signals 18 are output therefrom, and the control section 50 also controls the recording/reproducing section 22 to record the test-recording signals 18 on a predetermined area of the optical disc 28 while varying the intensity values of the writing power and erasing power, of the writing power and bottom power, or of the writing power, erasing power and bottom power. After that, under the control of the control section 50, the recorded test-recording signals 18 are reproduced so that the recording-quality-representing parameter detecting section 36 detects an asymmetry value, modulation factor or error rate of the signals, and then the optimum power determining section 38 determines a combination of optimum intensity values of the writing power and erasing power, the writing power and bottom power, or the writing power, erasing power and bottom power.

When the actual recording mode is instructed, the control section 50 controls the recording signal switching section 20 to connect to the actual-recording signal input 12 so that actual-recording signals 14 are introduced via the input 12, and the control section 50 also controls the recording/reproducing section 22 to record the actual-recording signals 14 on a program information recording area of the optical disc 28. Further, when the reproducing mode is instructed, the control section 50 controls the recording/reproducing section 22 to reproduce the actual-recording signals from the optical disc 28 by use of the low-power reproducing laser light beam 26 emitted from the optical head 24.

Figure 2:
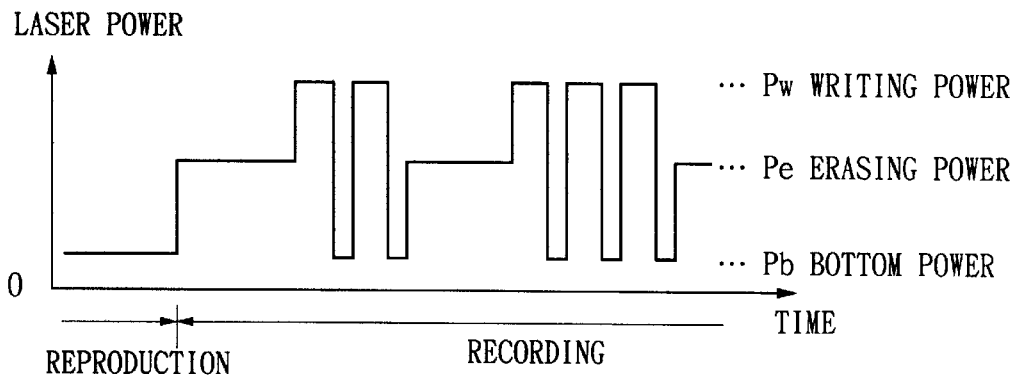
FIG. 2 is a conventional diagram showing an example variation in power intensity of a recording laser light beam applied to a Type 1 phase-change optical disc, and pits formed by such an intensity-varied beam.
Figure 3:
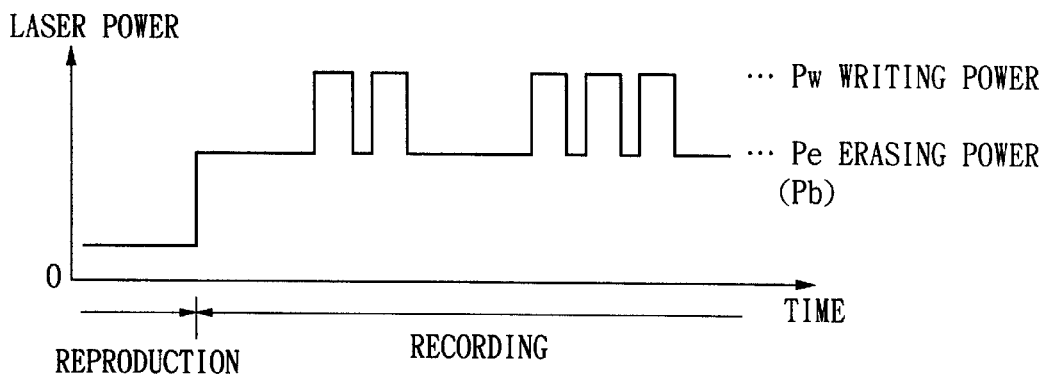
FIG. 3 is a conventional diagram showing an example variation in power intensity of a recording laser light beam applied to a Type 2 phase-change optical disc, and pits formed by such an intensity-varied beam.
Figure 4:
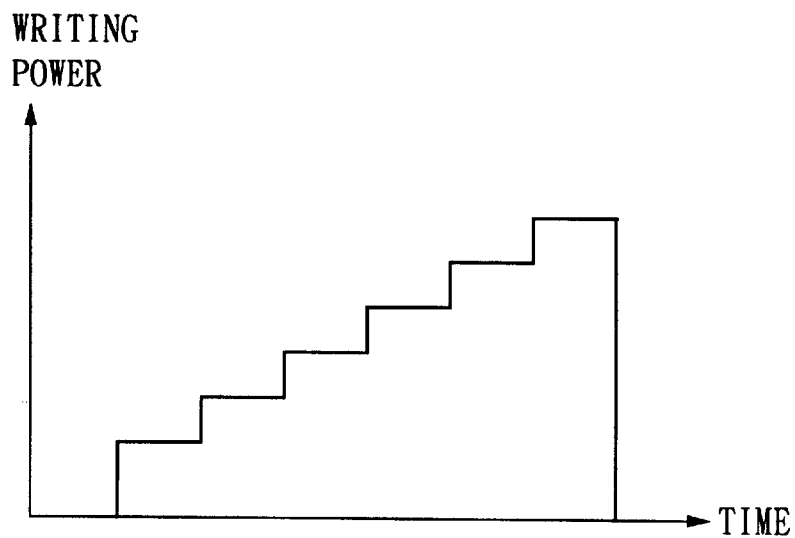
FIG. 4 is a diagram showing a manner in which the writing power intensity is varied so as to determine an optimum intensity value of the writing power.
Figure 9:
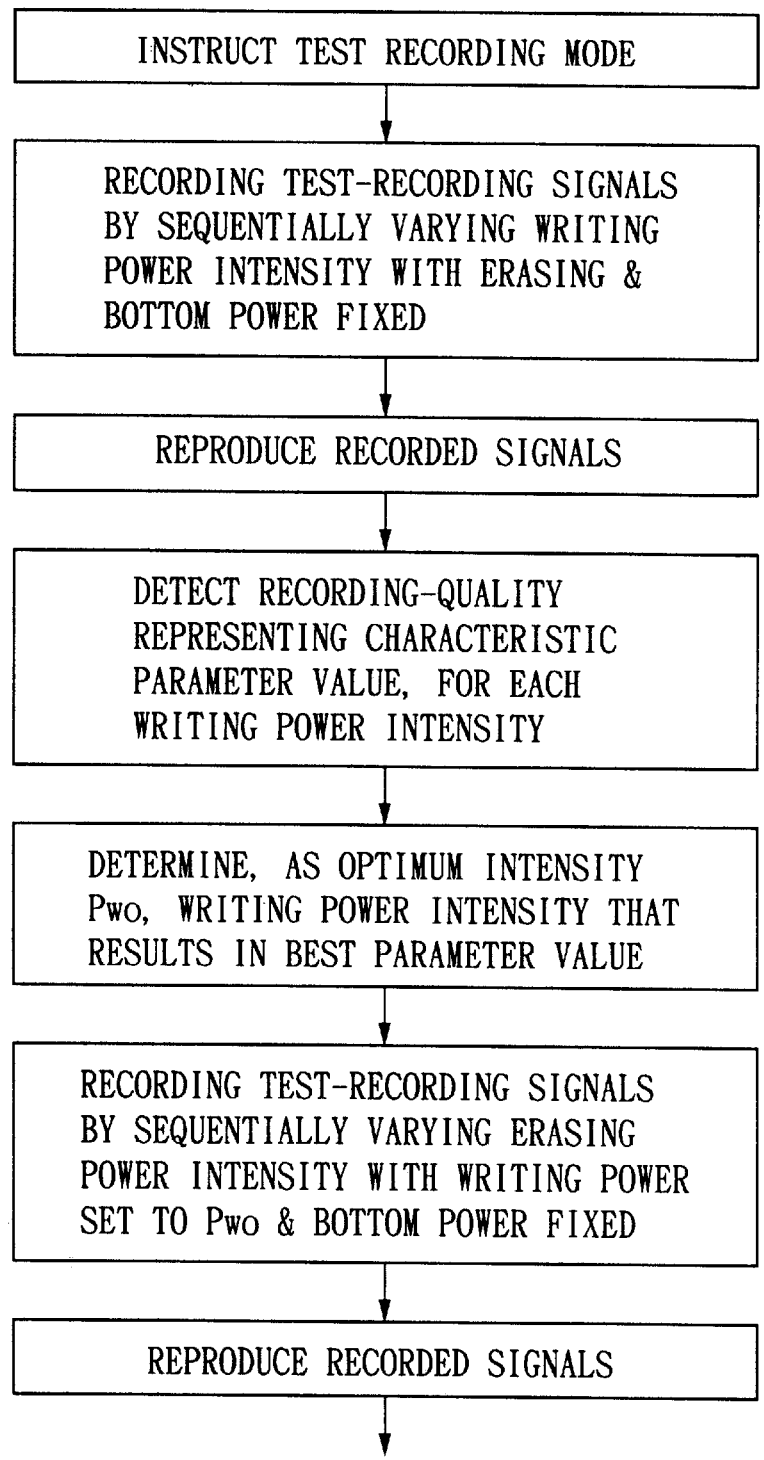
FIG. 9 is a flow chart showing a control performed during the test mode by the control section 50 of FIG. 1.
Figure 10:
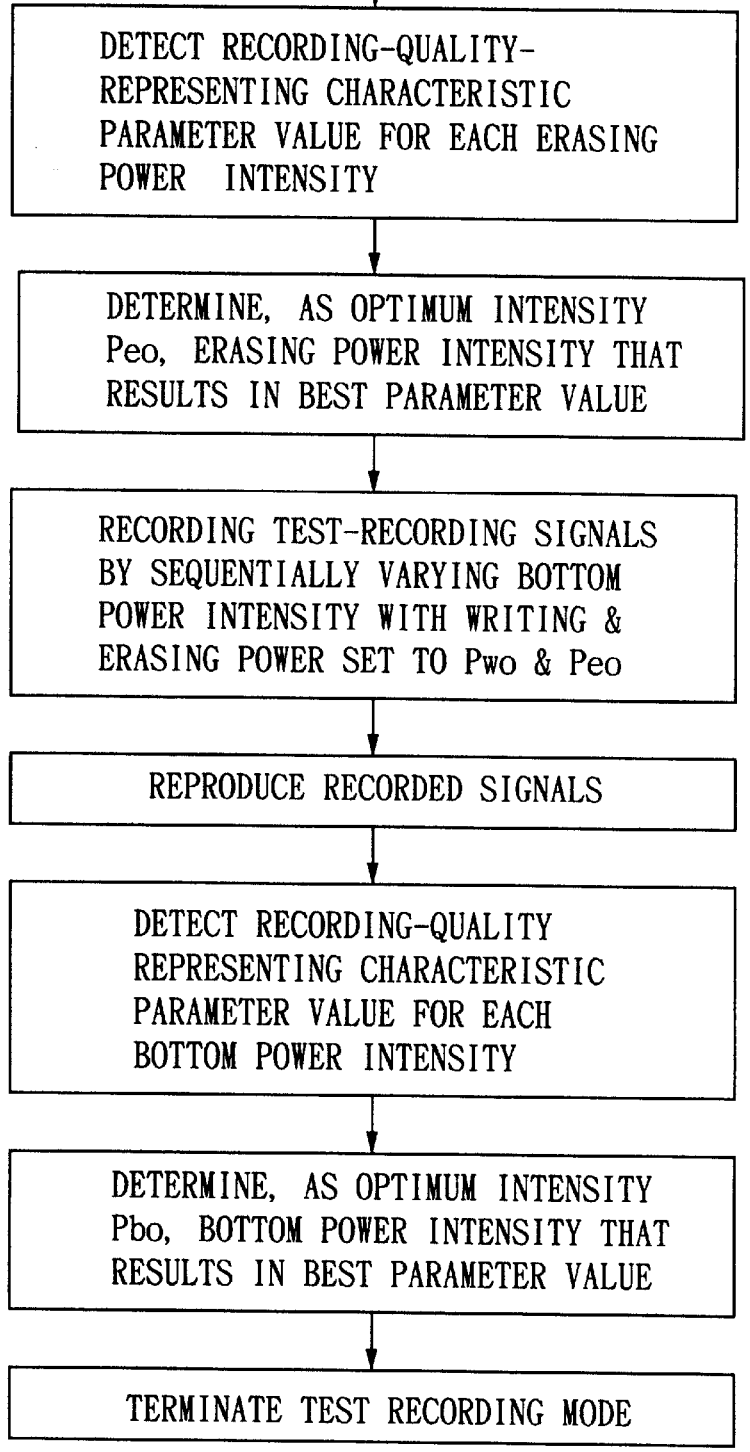
FIG. 10 is a flow chart showing the control continued from FIG. 9.

Now, with reference to FIGS. 9 and 10, a description will be made about various operations executed by the control section 50 in the test recording mode. When the test recording mode is instructed at step S1, an operation is performed to determine an optimum writing power intensity value Pwo. Namely, the optical head 24 is positioned to accurately face a predetermined area (e.g., the power calibration area or PCA disposed radially inward of the lead-in area) of the optical disc 28. Then, at step S2, EFM (Eight-to-Fourteen Modulation) signals in the CD format are generated as the test-recording signals 18, and the recording laser light beam 26 is modulated with the EFM signals to provide, for example, a divided-pulse laser light beam as shown at (a) in FIG. 2, with which test recording (writing) of the EFM signals is effected. During the test recording, the writing power intensity is automatically varied sequentially as shown in FIG. 4; for example, the writing power intensity is varied from 11 mW to 18 mW in 15 variation steps, 0.5 mW per variation step. The same test-recording signals 18 are repetitively recorded for each of the writing power intensity values.

The recording time at each step typically corresponds to one ATIP frame or 1/75 sec. (although any other suitable recording time may be chosen), during which time the test-recording signals 18 are repetitively recorded at a 588-channel-bit frequency with a 11T—11T synchronizing signal placed at the beginning. At that time, each recorded location and power intensity with which the recording has been effected are determined by detecting the prerecorded position or ATIP information on the optical disc 28. The recorded locations are stored into a memory (not shown) along with the corresponding intensity values of the writing power used.

At that time, the erasing power Pe may be varied, on the basis of a nominal value of (erasing power intensity Pe)/(writing power intensity Pw), e.g., 0.5, prestored in the ATIP information of the optical disc 28, in response to the varying writing power Pw in such a manner that the nominal value is maintained. Alternatively, the erasing power Pe may be fixed at a suitable intensity value, or the bottom power Pb may be fixed within a range of 0.3 to 1.5 mW.

Figure 5:
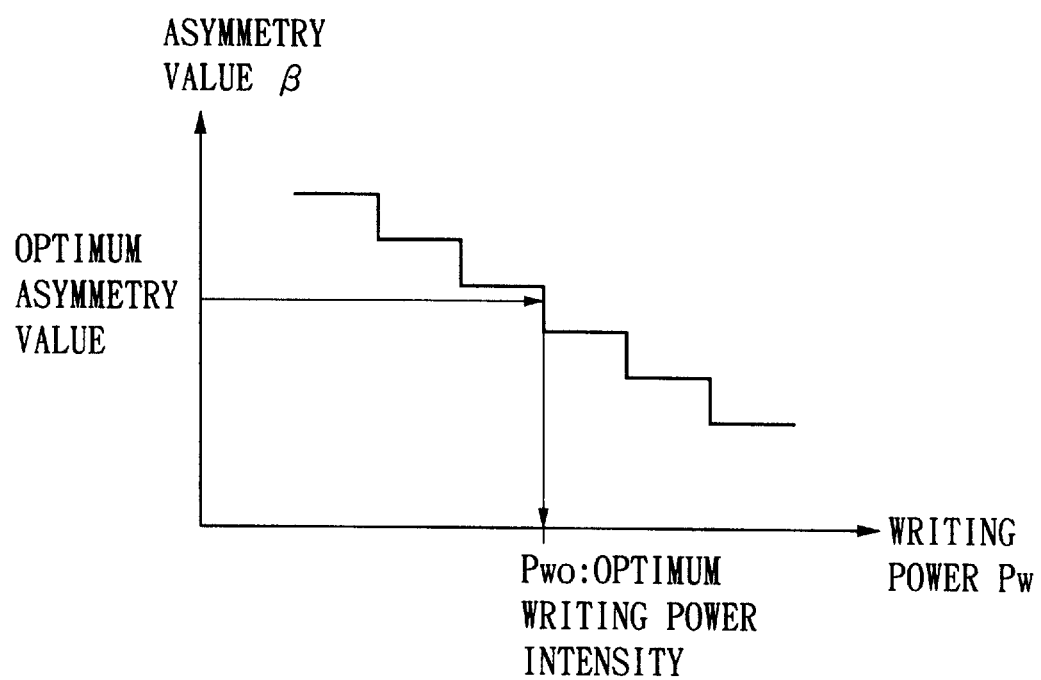
FIG. 5 is a diagram showing a manner in which an optimum intensity value of the writing power is determined from asymmetry values.
Figure 11:
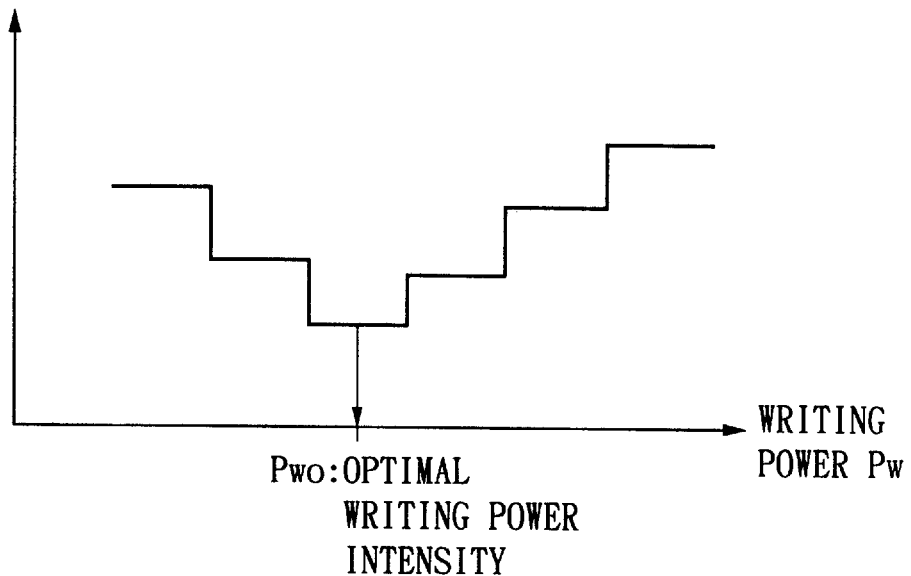
FIG. 11 is a view for explaining the optimum power from the error rate.

After completion of the test recording with the varied writing power, the test-recorded signals are reproduced at step S3, so as to determine an asymmetry value (FIG. 5), modulation factor (m or γ) or error rate (FIG. 11) for each of the varied writing power intensity values at step S4. Then, at step S5, one of the writing power intensity values which is considered to provide an optimum asymmetry value (e.g., 0.04), optimum modulation factor or lowest error rate is determined as the optimum writing power intensity value Pwo and stored into the memory (not shown).

Figure 12:
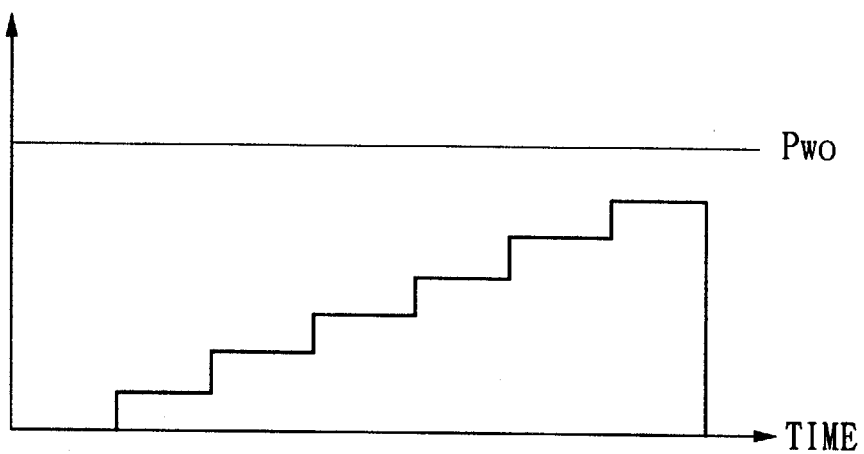
FIG. 12 is a view for explaining the step S6 in FIG. 9.
Figure 13:
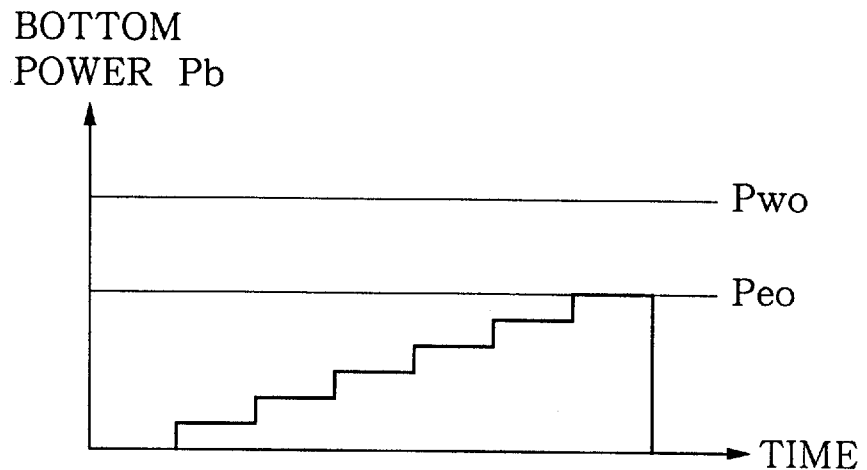
FIG. 13 is a view for explaining the step S10 in FIG. 10.

Following that, an operation is performed to determine an optimum erasing power intensity value Peo. Namely, with the writing power Pw fixed at the determined optimum writing power intensity value Pwo and the bottom power fixed within the range of 0.3 to 1.5 m, the erasing power is varied sequentially as shown in FIG. 12; for example, the erasing power intensity is varied from 2 mW to 9 mW in 15 variation steps, 0.5 mW per variation step. The test-recording signals 18 of the same pattern as previously mentioned are repetitively recorded for each of the varied erasing power intensity values, at step S6. At that time, the signals 18 may be written over or after the area recorded at step S2.

After completion of the test recording with the varied erasing power, the test-recorded signals are reproduced at step S7, so as to determine an asymmetry value, modulation factor or error rate for each of the varied erasing power intensity values Pe at step S8. Then, at step S9, one of the erasing power intensity values which is considered to provide an optimum asymmetry value (e.g., 0.04), optimum modulation factor or lowest error rate is determined as the optimum erasing power intensity value Peo and stored into the memory (not shown).

Following that, an operation is performed to determine an optimum bottom power intensity value Pbo. Namely, with the writing power Pw and erasing power Pe fixed at the respective optimum writing power intensity value Pwo and erasing power intensity value Peo, the bottom power intensity is sequentially varied from 0.2 mW to 3 mW in 15 variation steps, 0.2 mW per variation step. The test recording signals 18 of the same pattern as previously mentioned are repetitively recorded for each of the varied bottom power intensity values, at step S10. At that time, the signals 18 may be written over or after the area recorded at step S2 or S6.

After completion of the test recording with the varied bottom power Pb, the test-recorded signals are reproduced at step S11, so as to determine an asymmetry value, modulation factor or error rate for each of the varied bottom power intensity values Pb at step S12. Then, at step S13, one of the bottom power intensity values which is considered to provide an optimum asymmetry value (e.g., 0.04), optimum modulation factor or lowest error rate is determined as the optimum bottom power intensity value Pbo and stored into the memory (not shown). Note that the optimum erasing power Peo and optimum bottom power Pbo may sometimes take a same intensity value.

The test recording is completed in the above-mentioned manner. When the actual recording mode is instructed automatically or by user's operation after completion of the test recording, the recording signal switching section 20 is connected to the actual-recording signal input 12 so as to introduce actual-recording signals 14, and the respective optimum intensity values Pwo, Peo and Pbo of the writing, erasing and bottom power are retrieved from the memory. Then, in response to the introduced actual-recording signals 14, the recording/reproducing section 22 modulates the laser light beam to agree with the optimum intensity values to thereby record the signals on the program information recording area. These operations permit high-quality recording which would provide for minimized reproduction errors. Further, because the test recording can be executed any desired number of times in response to the automatic or user's instruction of the test recording mode, it is possible to properly deal with fluctuation of the optimum values resulting from time-varying conditions of the optical disc 28.

Advantageous results afforded by adjusting the erasing power intensity will be discussed below with reference to FIG. 14, which shows variations in error rate due to varied erasing power intensity in prior art. Specifically, different characteristics A and B of two discs are shown which result from a variation in the erasing power intensity. The different characteristics A and B are due to, for example, different specifications and different time-varying conditions of the discs. In this case, optimum erasing power intensity values Peoa and Peob are set for the characteristics A and B, respectively. If the erasing power is fixed at the value Peoa, the disc of the characteristic A presents only a low reproduction error rate, but the disc of the characteristic B presents such a high reproduction error that would prevent a proper reproduction of the recorded signals on the disc.

However, by adjusting the erasing power in accordance with the principle of the present invention, the erasing power can be set to the values Peoa and Peob for the disc characteristics A and B, respectively. In either case, a low error rate results, thus providing for high-quality recording.

Figure 14:
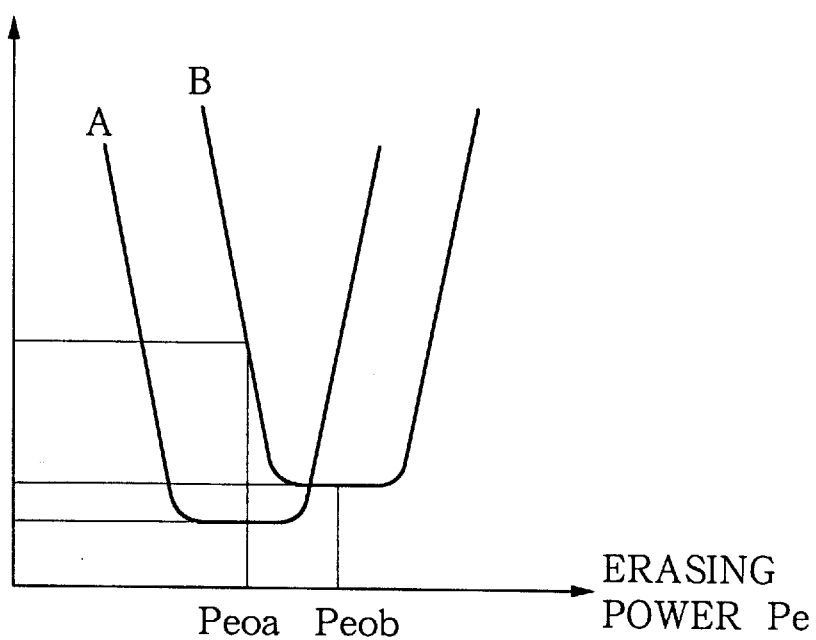
FIG. 14 is a view showing change in the error rate by the erasing power.

For the bottom power, a similar problem to that of FIG. 14 is encountered in prior art. However, by adjusting the bottom power in accordance with the principle of the present invention, high-quality recording is achieved.

Whereas the present invention has been described above as determining the optimum intensity values in the order of the writing power Pw, erasing power Pe and bottom power Pb, they may be determined in the order of the writing power Pw, bottom power Pb and erasing power Pe. Further, the present invention has been described above as determining the optimum intensity values for all of the writing power Pw, erasing power Pe and bottom power Pb. Alternatively, the optimum intensity values may be determined for the writing power Pw and only one of the erasing power Pe and bottom power Pb, and a predetermined fixed value may be used for the other of the erasing power Pe and bottom power Pb. This alternative will also afford some benefits. For Type 2 phase-change optical discs (i.e., a type where the intensity of the writing power Pw and erasing power Pe is set separately), the optimum intensity values may be determined only for the writing and erasing power Pw and Pe. Further, for write-once optical discs, the optimum intensity values may be determined only for the writing and bottom power Pw and Pb; in this case, the test recording is performed using different portions of the PCA area. Furthermore, although the present invention has been described as performing the overwrite recording by use of a single recording laser light beam, it is of course applicable to other cases where recording and erasing light beams are emitted from separate sources to carry out the overwrite recording.

The present invention may be implemented by a computer installing an operation program and data corresponding to the invention. In this case, the operation program and data may be delivered to a user in the form that the operation program and data are stored in a storage medium such as a CD-ROM or a floppy disk which can be read by such computer. In a case where the computer is connected to a communication network such as LAN, Internet or a telephone circuit, the operation program and data may be delivered to a user through such communication network.

What is claimed is:

1. A method for recording information on a rewritable or write-once optical disc by use of a laser light beam that is set to different intensity values to function as writing power and erasing power or as writing power and bottom power, said method comprising the steps of:

recording test-recording signals onto the optical disc by variously changing respective intensity values of the writing power and erasing power or of the writing power and bottom power;

reproducing the recorded test-recording signals from the optical disc, so as to detect a predetermined characteristic parameter representative of recording quality of the recorded test-recording signals;

determining a combination of optimum intensity values of the writing power and erasing power or of the writing power and bottom power that results in a practically best value of the characteristic parameter; and recording actual-recording signals onto the optical disc by controlling the laser light beam in accordance with the combination of optimum intensity values determined by the step of determining.

2. A method as recited in any one of preceding claim 1 wherein said parameter representative of recording quality is asymmetry of the reproduced test-recording signals, a modulation factor defined as an index of HF amplitudes of the reproduced test-recording signals, or an error rate of the reproduced reproduced test-recording signals, and wherein said parameter is determined to be practically best when the asymmetry or modulation factor is substantially optimum or the error rate is substantially lowest.

3. A method for recording information on a rewritable optical disc while erasing older information by use of a laser light beam that is set to different intensity values to function as writing power, erasing power and bottom power, said method comprising:

a first step of recording test-recording signals onto the optical disc by variously changing the intensity value of the writing power with the erasing power and bottom power fixed at suitable intensity values, reproducing the recorded test-recording signals from the optical disc so as to detect a predetermined characteristic parameter representative of recording quality of the recorded test-recording signals, and then determining an optimum intensity value of the writing power that results in a practically best value of the characteristic parameter;

a second step of recording test-recording signals onto the optical disc by variously changing the intensity value of one of the erasing power and bottom power with the writing power fixed at the optimum intensity value determined by said first step and the other of the erasing power and bottom power fixed at a suitable intensity value, reproducing the recorded test-recording signals from the optical disc so as to detect a predetermined characteristic parameter representative of recording quality of the recorded test-recording signals, and then determining an optimum intensity value of the one of the erasing power and bottom power;

a third step of recording test-recording signals onto the optical disc by variously changing the intensity value of the other of the erasing power and bottom power with the writing power fixed at the optimum intensity value determined by said first step and the one of the erasing power and bottom power fixed at the optimum intensity value determined by said second step, reproducing the recorded test-recording signals from the optical disc so as to detect a predetermined characteristic parameter representative of recording quality of the recorded test-recording signals, and then determining an optimum intensity value of the other of the erasing power and bottom power; and recording actual-recording signals onto the optical disc by controlling the laser light beam in accordance with a combination of the optimum intensity values of the writing power, erasing power and bottom power.

4. A method for recording information on a rewritable optical disc while erasing older information by use of a laser light beam that is set to different intensity values to function as writing power, erasing power and bottom power, said method comprising the steps of:

recording test-recording signals onto the optical disc by variously changing respective intensity values of the writing power and erasing power, of the writing power and bottom power or of the writing power, erasing power and bottom power;

reproducing the recorded test-recording signals from the optical disc, so as to detect a predetermined characteristic parameter representative of recording quality of the recorded test-recording signals;

determining a combination of optimum intensity values of the writing power and erasing power, of the writing power and bottom power or of the writing power, erasing power and bottom power that results in a practically best value of the characteristic parameter; and recording actual-recording signals onto the optical disc by controlling the laser light beam in accordance with the combination of optimum intensity values determined by the step of determining.

5. A device for recording information on a rewritable optical disc while erasing older information by use of a laser light beam that is set to different intensity values to function as writing power, erasing power and bottom power, said device comprising:

an actual-recording signal input section which introduces actual-recording signals into said device;

test-recording signal generating section which generates test-recording signals for use in test recording that is intended to determine respective optimum intensity values of the writing power and erasing power, of the writing power and bottom power or of the writing power, erasing power and bottom power;

a recording signal switching section which selects either of the actual-recording signals and the test-recording signals;

a recording and reproducing section which, in a recording mode, records onto the optical disc the recording signals, selected via said recording signal switching section, by properly setting the intensity values of the writing power, erasing power and bottom power of the laser light beam emitted from an optical head, and in a reproduction mode, reads out the recorded signals from the optical disc by properly setting an intensity value of reproducing power of the laser light beam emitted from the optical head;

a recording-quality-representing parameter detecting section which detects a predetermined characteristic parameter representative of recording quality of the rest-recording signals reproduced from the optical disc by said recording and reproducing section;

an optimum power determining section which, on the basis of a detection result of said recording-quality-representing parameter detecting section, determines a combination of optimum intensity values of the writing power and erasing power, of the writing power and bottom power or of the writing power, erasing power and bottom power that results in a practically best value of the characteristic parameter;

an operational mode instructing section which selectively instructs one of a test recording mode and an actual recording mode; and a control section which, when the test recording mode is instructed by said operational mode instructing section, causes said recording signal switching section to select the test-recording signals, controls said recording and reproducing section to record the test-recording signals by variously changing the intensity values of the writing power and erasing power, of the writing power and bottom power or of the writing power, erasing power and bottom power, and then causes said recording and reproducing section to reproduce the recorded test-recording signals from the optical disc so as to allow said optimum power determining section to determine the combination of optimum intensity values of the writing power and erasing power, of the writing power and bottom power or of the writing power, erasing power and bottom power on the basis of the reproduced test-recording signals, and when the actual recording mode is instructed by said operational mode instructing section, causes said recording signal switching section to select the actual-recording signals and controls said recording and reproducing section to record the actual-recording signals onto the optical disc in accordance with said combination of optimum intensity values determined by said optimum power determining section.

6. A mchine readable media containing instructions for causing said machine to perform a method for recording information on a rewritable or write-once optical disc by use of a laser light beam that is set to different intensity values to function as writing power and erasing power or as writing power and bottom power, said method comprising the steps of:

recording test-recording signals onto the optical disc by variously changing respective intensity values of the writing power and erasing power or of the writing power and bottom power;

reproducing the recorded test-recording signals from the optical disc, so as to detect a predetermined characteristic parameter representative of recording quality of the recorded test-recording signals;

determining a combination of optimum intensity values of the writing power and erasing power or of the writing power and bottom power that results in a practically best value of the characteristic parameter; and recording actual-recording signals onto the optical disc by controlling the laser light beam in accordance with the combination of optimum intensity values determined by the step of determining.

* * * * *